Figure 1:
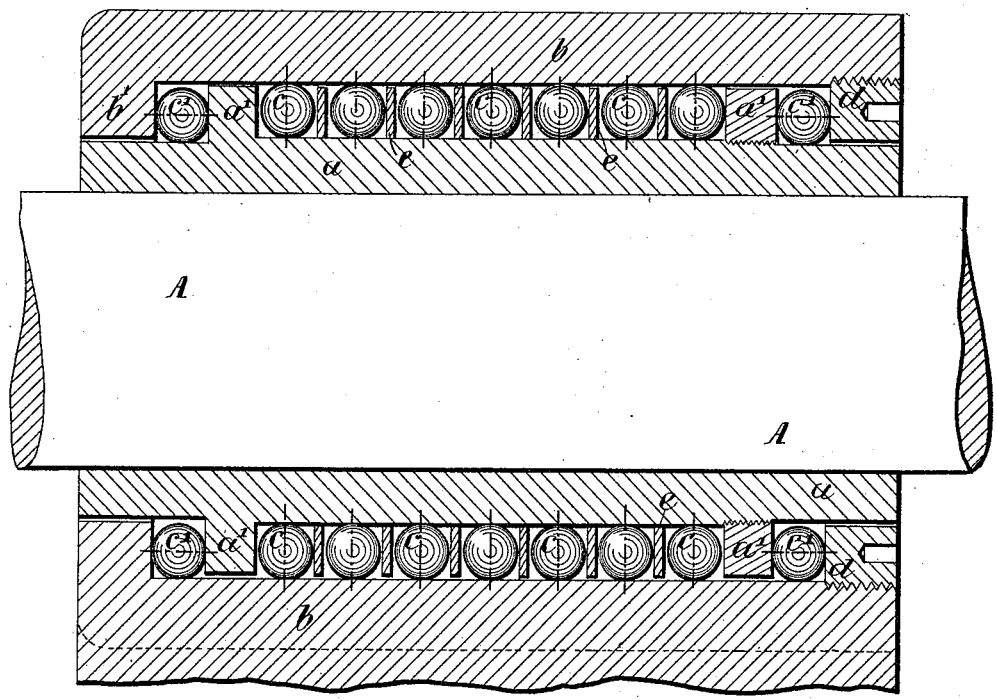

(No Model.) 3 Sheets—Sheet 1.

G. F. SIMONDS.
BALL BEARING.

No. 434,483. Patented Aug. 19, 1890.

Witnesses:
J. A. Rutherford.
Geo. W. Rea.

Inventor: George F. Simonds
By James L. Norris
Attorney.

(No Model.) 3 Sheets—Sheet 2.

G. F. SIMONDS.
BALL BEARING.

No. 434,483. Patented Aug. 19, 1890.

(No Model.) 3 Sheets—Sheet 3.

G. F. SIMONDS.
BALL BEARING.

No. 434,483. Patented Aug. 19, 1890.

Witnesses:
J. A. Rutherford
Geo. H. Rea.

Inventor
George F. Simonds
By James L. Norris
Attorney

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,483, dated August 19, 1890.

Application filed May 24, 1890. Serial No. 353,086. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to ball-bearings of the kind or class wherein some of the balls bear against and roll upon concentric surfaces for the purpose of supporting a shaft or axle or a wheel, or other part which rotates thereon, and the remainder of the said balls bear against and roll upon plane surfaces for the purpose of resisting thrust or end pressure.

My said invention comprises the employment, in a ball-bearing, of a tube or sleeve having formed or fixed thereon two circumferential ribs or collars, each of which is provided with a plane bearing-surface for the balls for resisting thrust or end pressure, and between which is an annular recess or cavity for the balls for supporting the shaft or axle or the part which rotates thereon or for otherwise resisting or supporting radial pressure.

My said invention, moreover, comprises the combination of concentric tubes or sleeves, one of which has two circumferential projections, ribs, or collars formed thereon or secured thereto by means of screw-threads or other convenient means, and the other of which is provided with one or more screw-threaded or other rings or flanges for closing the annular space between the said tubes or sleeves at one or both ends of the bearing, balls for supporting radial pressure located between the said ribs or collars and arranged to bear against and roll upon concentric surfaces on the inner and outer tubes or sleeves, and balls for resisting thrust or end pressure located between the ribs or collars and the said rings or flanges.

My said invention, moreover, comprises other improvements, hereinafter set forth.

In the accompanying drawings, Figures 1, 2, 3, and 4 are longitudinal central sections illustrating different forms of my improved ball-bearing.

A is the shaft or axle.

$a$ is the inner tube or sleeve, which is provided with two circumferential ribs or collars $a'$, and which is firmly secured upon the said shaft.

$b$ is the outer tube, sleeve, or casing surrounding and concentric with the said inner tube or sleeve.

$c$ $c'$ are the spherical rollers or balls.

$d$ $d$ are screw-threaded rings or flanges fixed in one or both ends of the said outer tube, sleeve, or casing $b$.

$e$ $e$ are rings for separating the balls $c$ of one series or group from those of an adjacent series or group.

Figure 2:
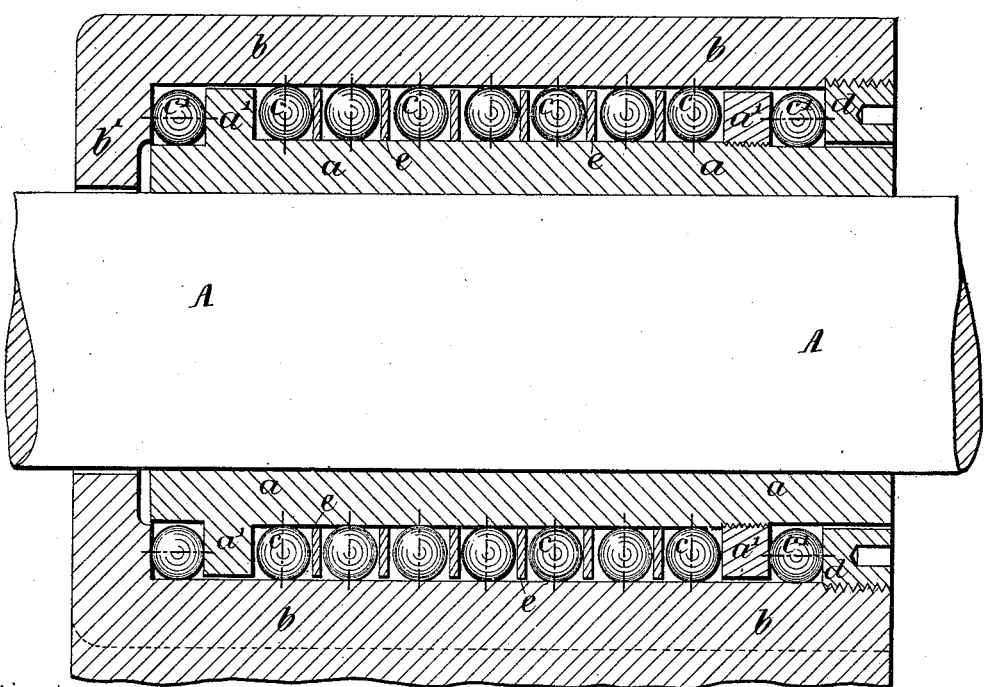

In the bearing shown in Fig. 1 and in that shown in Fig. 2 the tube or sleeve $a$ has one of the ribs or collars $a'$ formed integrally therewith and the other rib or collar $a'$ screwed tightly thereon. The outer tube, sleeve, or casing $b$ is provided with an internal flange or collar $b'$, which closes the annular space between the two tubes or sleeves at one end of the bearing. This flange is made with a plane surface which is parallel to a corresponding plane surface on the adjacent rib or collar $a'$, and between these plane surfaces is arranged a circular series or group of balls $c'$ for resisting thrust or end pressure. The annular space between the two rings or sleeves at the other end of the bearing is closed by a screw-threaded ring or flange $d$, having a plane surface which is parallel to a corresponding plane surface on the adjacent rib or collar $a'$, another circular series or group of balls $c'$ for resisting thrust or end pressure being arranged between these plane surfaces. It will be seen that by turning the screw-threaded ring $d$ in the proper direction the balls $c'$ of each series or group may be brought to a bearing against the aforesaid plane surfaces, the ring or flange $d$ being first moved toward the adjacent rib or collar $a'$ until the series or group of balls next to the said ring are brought to a bearing against the corresponding plane surfaces, and the outer tube, sleeve, or casing $b$ being then drawn toward the said ring $d$ until the balls between the flange $b'$ and the corresponding rib or collar $a'$ are brought to a bearing.

In the bearing shown in Fig. 1 the tube or sleeve $a$ extends through the flange $b'$. In the bearing shown in Fig. 2 the said tube or sleeve extends to within a short distance from the said flange $b'$.

Figure 3:
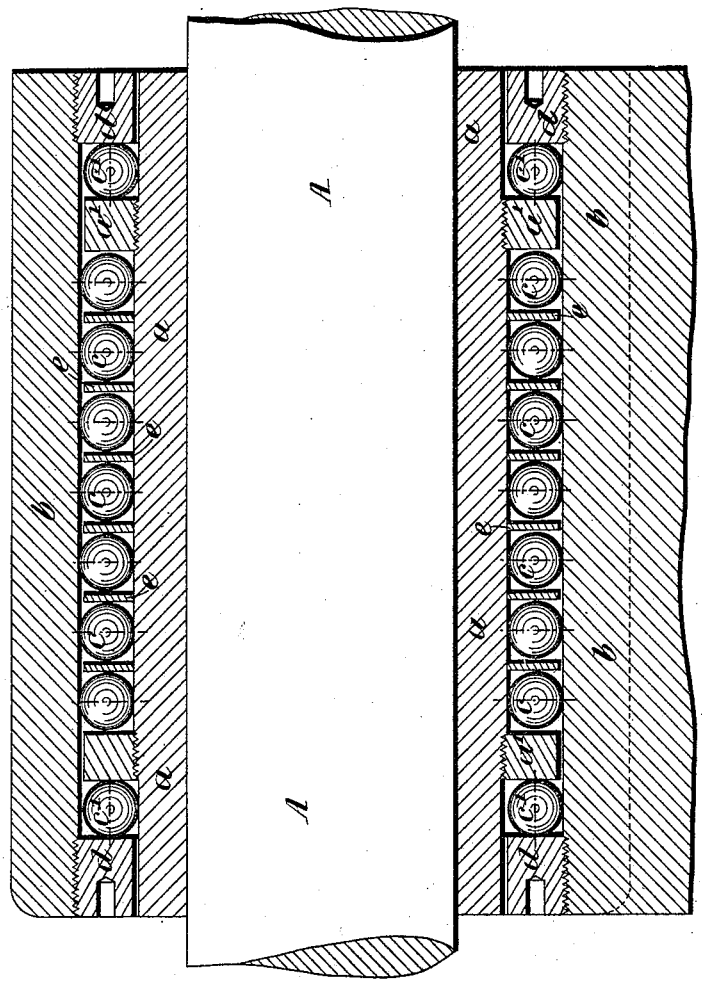

In the bearing shown in Fig. 3 both of the ribs or collars $a'$ are secured upon the tube or sleeve $a$ by means of screw-threads and a screw-threaded ring or flange $d$ is fixed in each end of the outer tube, sleeve, or casing $b$ for the purposes above specified, each of the rings $d$ being adjustable for the purpose of bringing the balls $c'$ to a bearing against the plane surfaces of the corresponding rib or collar $a'$ and ring $d$.

Figure 4:
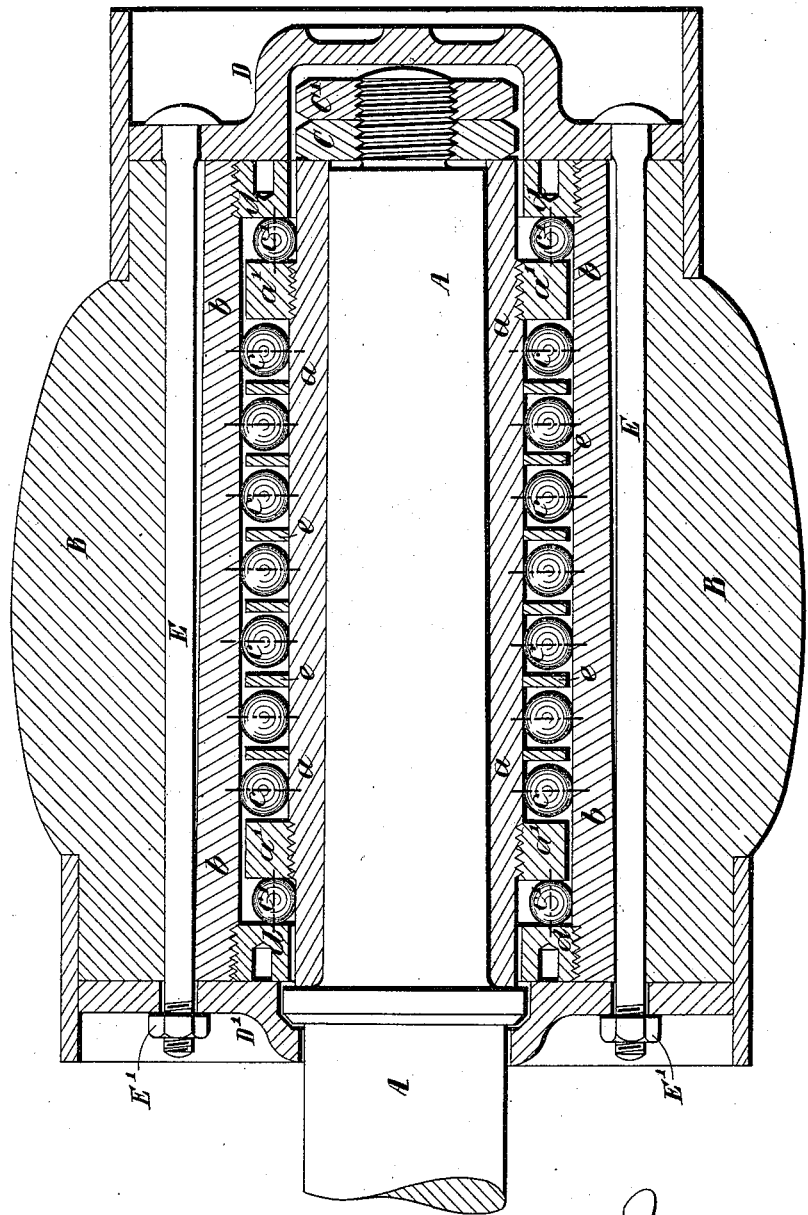

In Fig. 4 I have shown an axle-bearing constructed according to my present invention. B is the nave or hub of the wheel. C C' are the nuts for securing the wheel upon the axle A. D D' are caps or covers for closing the ends of the bearing, and held in place by screw-bolts E, provided with nuts E'.

My improvements are advantageously applicable to various kinds of bearings, and it is obvious that the details of construction of the bearing can be somewhat modified without departing from the nature of my invention.

Certain features of construction shown and described, but not claimed in this application, are shown, described, and claimed in applications filed by me, Serial Nos. 331,639 and 352,378.

What I claim is—

1. In a ball-bearing, a tube or sleeve having two circumferential ribs or collars, each provided with a plane bearing-surface for the balls for resisting thrust or end pressure, and having between the said ribs or collars an annular recess or cavity for the balls for resisting or supporting radial pressure.

2. In a ball-bearing, the combination of a tube or sleeve having two circumferential ribs or collars, each provided with a plane bearing-surface, another tube or sleeve concentric with the first and provided with plane bearing-surfaces parallel to those of the said ribs or collars, balls for resisting thrust or end pressure located between the pairs of plane bearing-surfaces, and balls for resisting or supporting radial pressure located between the said ribs or collars and arranged to bear against and roll upon concentric surfaces on the said tubes or sleeves.

3. In a ball-bearing, the combination of concentric tubes or sleeves, one of which is provided with two circumferential ribs or collars, and the other with rings or flanges for closing the annular spaces between the said tubes or sleeves at the ends of the bearing, balls located between the said ribs or collars and arranged to bear against and roll upon concentric surfaces on the said tubes or sleeves, and balls arranged to bear against and roll upon plane surfaces on the said rings or flanges and ribs or collars, substantially as and for the purposes set forth.

4. In a ball-bearing, the combination of an inner tube or sleeve having two external circumferential ribs or collars, an outer tube, sleeve, or casing surrounding and concentric with the said inner tube or sleeve, circular series or groups of balls located between the said ribs or collars and arranged to bear against and roll upon concentric surfaces on the said tubes or sleeves, rings or flanges formed or fixed in the ends of the said outer tube, sleeve, or casing, and a circular series or group of balls located at each end of the bearing and arranged to bear against and roll upon plane surfaces on the corresponding rib or collar and ring or flange, substantially as and for the purposes set forth.

5. In a ball-bearing, the combination of the inner tube or sleeve $a$, having the ribs or collars $a'$, the outer tube, sleeve, or casing $b$, surrounding the said inner tube or sleeve, balls $c$, located between the said ribs or collars and arranged to bear against and roll upon concentric surfaces on the said tubes or sleeves, adjustable rings $d$, screwed into the ends of the said outer tube, sleeve, or casing $b$, and balls $c'$, arranged to bear against and roll upon plane surfaces on the said ribs or collars $a'$ and rings $d$, substantially as and for the purposes set forth.

6. In a ball-bearing, the combination of the inner tube or sleeve $a$, having the ribs or collars $a'$, the outer tube, sleeve, or casing $b$, surrounding the said inner tube or sleeve, balls $c$, located between the said ribs or collars and arranged to bear against and roll upon concentric surfaces on the said tubes or sleeves, rings $e$, separating the balls of one series or group from those of another series or group, adjustable rings $d$, screwed into the ends of the said outer tube, sleeve, or casing $b$, and balls $c'$, arranged to bear against and roll upon plane surfaces on the said ribs or collars $a'$ and rings $d$, substantially as and for the purposes set forth.

In testimony whereof I have hereunto signed my name in the presence of two subscribing witnesses.

GEORGE FREDERICK SIMONDS.

Witnesses:
GEO. BURNETT,
DAVID YOUNG.